United States Patent

Harkins et al.

[11] 4,090,746
[45] May 23, 1978

[54] PRESS FIT BEARING RETAINING BEARING SIZE WHEN INSERTED INTO SUPPORT

[75] Inventors: Samuel Jordan Harkins, Lansdale; Curtis Robert Alvin Johnson, Flourtown, both of Pa.

[73] Assignee: Leeds & Northrup Company, North Wales, Pa.

[21] Appl. No.: 783,592

[22] Filed: Apr. 1, 1977

[51] Int. Cl.$^2$ ............................................. F16C 27/06
[52] U.S. Cl. ................................. 308/26; 308/237 A; 308/238; 403/225; 403/357
[58] Field of Search .................. 308/26, 28, 15, 37, 308/3 R, 4 R, 4 A, 237, 238, DIG. 7, DIG. 8; 403/225, 228, 372, 265, 268, 357; 267/57, 63 R; 248/9, 15; 64/27 NM

[56] References Cited

U.S. PATENT DOCUMENTS

| | | | |
|---|---|---|---|
| 3,018,146 | 1/1962 | Euwe et al. | 308/238 |
| 3,110,530 | 11/1963 | Herman | 308/238 |
| 3,711,168 | 1/1973 | Wendel et al. | 308/26 |
| 3,859,885 | 1/1975 | Hayashida | 308/238 X |

Primary Examiner—Trygve M. Blix
Assistant Examiner—Douglas C. Butler
Attorney, Agent, or Firm—R. F. MacKay; W. G. Miller

[57] ABSTRACT

A press fit sleeve bearing member supported in a bearing support in which the support portion of the bearing member is of limited length along the longitudinal dimension of the bearing member. The bearing zone is isolated from the support zone by a transition zone to isolate the bearing zone from dimensional changes due to distortions created by the press fit.

4 Claims, 3 Drawing Figures

PRESS FIT BEARING RETAINING BEARING SIZE WHEN INSERTED INTO SUPPORT

BACKGROUND OF THE INVENTION

This invention relates to bearing members adapted to be inserted into bearing support members by a mechanical press fit.

In mechanical assemblies involving the use of bearings and supports therefore, it is often desirable to insert the bearing member into the support member and secure it in place by means of a press fit. Such an arrangement by its simplicity inevitably results in a saving in assembly time. When the conventional sleeve type bearing is mounted in a support in this fashion, it is necessary to perform additional steps in order to insure that the diameter of the bearing surface has not changed during the manufacturing assembly. When a bearing is to be secured in a bearing support member by press fit means, the outer diameter of the bearing must be larger than the diameter of the hole in the bearing support member into which it is to be pressed. The operation of pressing the bearing into the bearing support member results in a compression of the material of the bearing and a reduced diameter of the bore of the bearing member.

In the past it has been common practice when a press fit is used to secure a bearing in a support member, to resize the bore of the bearing to restore it to its original or desired dimension. This resizing is generally accomplished by a reaming action. Where the bearing is of sintered bronze material, it has been found that reaming the inner bore of the bearing to produce the proper size sometimes results in the interstices of the sintered bronze material being closed by the reaming action and thus resulting in an impaired bearing lubrication surface.

In some instances the problem of a reduction in size of the bore has been overcome by inserting in the bearing a mandrel of appropriate diameter during the operation of press fitting the bearing into the bearing support member. With the mandrel so located in the bore of the bearing member, the dimensions of the bore cannot be changed during the press fit operation because of the presence of the mandrel. The sintered bronze material is compressed in order to provide not only the holding action with the support member but also to retain the original inner bore dimension. When the press fit operation is complete, the mandrel is then removed to provide an appropriately secured bearing member with the proper dimensioned bore. If the bearing material is other than sintered bronze and particularly a material which has an elasticity, the use of the mandrel will not provide the desired inner bore dimension because when the mandrel is removed, the compressive forces in the material of the bearing will be released and the elastic material will move to reduce the bore dimension.

SUMMARY OF THE INVENTION

It is an object of this invention to provide an improved press fit bearing construction in which the inner bore of the bearing does not require that it be resized after the press fit operation. This is accomplished by providing along the length of the bearing a support zone, a transition zone and a bearing zone, respectively, wherein the bearing is supported in the bearing support member in the support zone and the shaft to be carried by the bearing is supported in the bearing zone with the transition zone between the two to provide for relief of dimensional changes due to the press fit of the bearing into the support member.

BRIEF DESCRIPTION OF THE DRAWINGS

A better understanding of the present invention may be had when the following detailed description is read in connection with the accompanying drawings in which:

In FIG. 1 there is shown a support member 10 having a bore 10a into which is fitted a bearing member 11 by a press fit operation. The bearing member 11 is provided with an inner bore 11a of internal dimension to provide a bearing surface for a shaft 12 supported thereby. As shown, the bearing member 11 is provided with a counterbore 11b extending from the right-hand side of the bearing member 11. The bearing member 11 is also equipped with an undercut portion 11c extending from the left-hand end of the bearing member 11.

Figure 1:
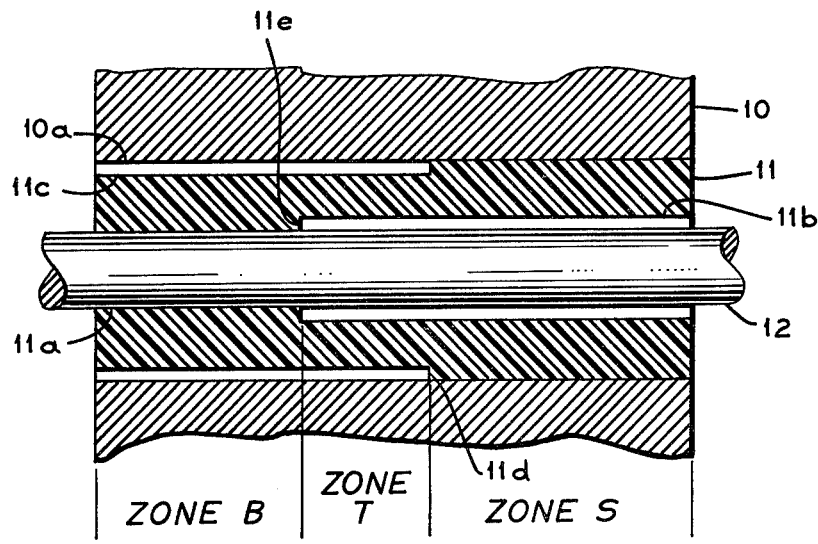
FIGS. 1-3 shows three different embodiments of the invention including the bearing zone, the transition zone and the support zone.

The configuration of bearing member 11 divides its length into three distinct zone identified as zone S, zone T and zone B. It will be noted that zone S extends from the right end of bearing member 11 to a shoulder 11d formed in the outer periphery of the bearing member 11 by the undercut portion 11c. This zone S performs the support function for the bearing member in the support member 10. The relative dimensions of the bore 10a of support member 10 and the outer diameter of the bearing member 11 provide a press fit when the bearing member is inserted into the bore 10a.

While the action of pressing the bearing member 11 into the support member 10 will result in compression of the bearing member 11 in the region of zone S, the counterbore 11b is sized to prevent the bearing member 11 from interfering with, or coming in contact with, the shaft 12 in the support zone S.

The zone B on the left-hand end of bearing member 11 is shown extending from the left-hand end of the bearing member 11 to the shoulder 11e produced by the counterbore 11b. This bearing zone B has the central bore 11a to provide the bearing surface for the shaft 12 and as a result of the undercut portion 11c, does not come in contact with the bearing support member 10 and therefore receives no direct compressive forces from the support member 10 as a result of the press fit operation.

The zone T of bearing member 11 provides a transition zone between the bearing zone B and the support zone S to insure that none of the dimensional changes occurring in the support zone S due to compression in zone S due to the press fit operation is transmitted to the bearing zone B to produce a change in the diameter of the bore 11a that provides the bearing surface for the shaft 12. With the three zones provided in the bearing member 11, it is possible to press fit the bearing member 11 into the support member 10 without the requirement of resizing the central bore 11a which provides the bearing surface for shaft 12.

As shown in FIG. 1, the bearing member 11 is made of a synthetic resin or plastic material. Any of the plastic materials presently used for bearings could be used in this application. Applicants have found that an acetyl based alloy sold by the Bearings Division Garlock Inc., 16 Springdale Rd., Cherry Hill, N.J., under the identification Multilube 31 plastic bearing, is particularly well suited for this application.

The length of the transition zone in any application will, to a large measure, depend upon the material selected for the bearing member and the volume of material to be compressed in the support zone by the press fit operation. It will be apparent that if the bearing material is of relatively high elasticity and the bearing support zone is not subject to the large dimensional changes, due to the press fit operation, the transition zone may be relatively short without transmitting any of the dimensional changes occurring in the support zone to the bearing zone. On the other hand, if the bearing material is relatively rigid, then it may be necessary to have a longer transition zone in order to avoid changes in dimension in the bearing zone.

Figure 2:
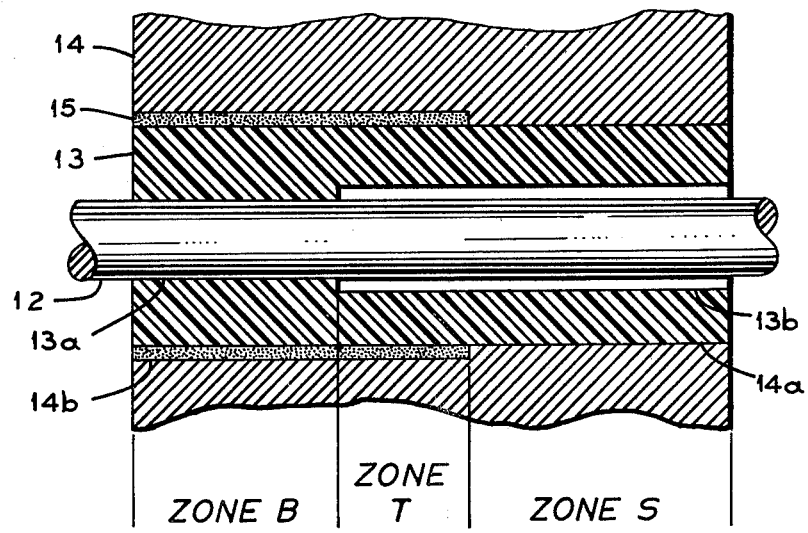

FIG. 2 shows a different embodiment of the invention in which the shaft 12 is mounted in a bearing member 13 which in turn is supported by support member 14. In FIG. 2, the bearing member 13 differs from the bearing member 11 of FIG. 1 in that the outer surface of the bearing member 13 does not have a region having a reduced diameter. The remainder of the bearing member 13 is similar to the bearing member 11 in that there is included a central bore 13a providing a bearing surface for the shaft 12 and a counterbore 13b. In FIG. 2, a bearing support member 14 has a bore 14a dimensioned to provide a force fit for the bearing member 13. The bearing member 14 is also provided with a counterbored portion 14b that is sized to avoid contact with the outer cylindrical surface of the bearing member 13 when it is pressed into the bore 14a of the support member 14. It will be noted that the counterbore area 14b in the bearing support member 14 and the counterbore 11b in the bearing member 13 provide the bearing member with the three zones—zone S, zone T and zone B—that were identified in the discussion with respect to FIG. 1.

There is additionally shown in FIG. 2 a cement 15 located in the annular space created by the outer surface of bearing member 13 and the counterbore 14b. This cement 15 may be added to the space after the bearing member 13 has been inserted by press fit operation in the support member 14 to provide additional lateral support to the bearing member 13 in the region of the bearing zone B and the transition zone T. While not essential to the operation of the bearing, this cement can be used to provide support in the event that the shaft 12 receives transient lateral forces as would be created by a blow on the shaft 12.

Figure 3:
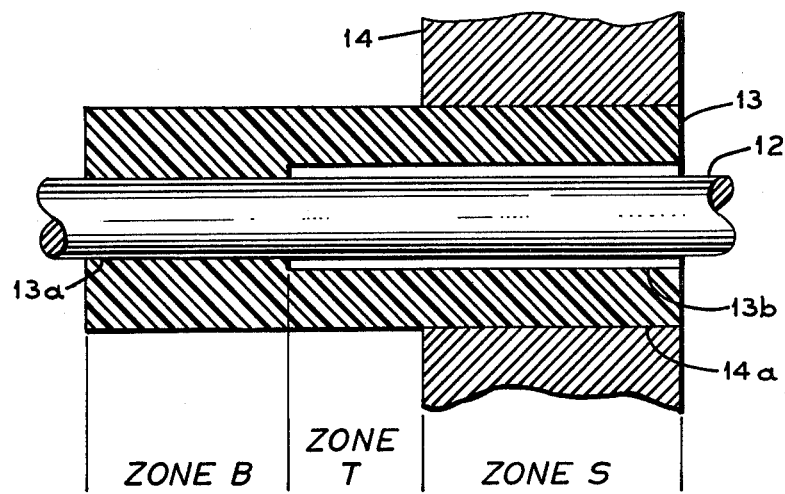

A still further embodiment of the invention is disclosed in FIG. 3 in which the bearing member 13 is identical with the bearing member 13 of FIG. 2 but in which the bearing support member 14 is not as thick as the support member 14 of FIG. 2. In FIG. 3 it is to be noticed that the bearing is supported in cantilever fashion from the support member 14 again as by a press fit between the bearing support member 14 and bearing member 13. The principles of the invention are still present in FIG. 3, as shown by the markings on the figures identifying the support zone S, the transition zone T and the bearing zone B. The arrangement of FIG. 3 is less desirable than those shown in FIGS. 1 and 2 in that the bearing could be damaged because it is exposed and not shielded or protected by the bearing support member, as in the FIGS. 1 and 2.

What is claimed is:

1. An improved assembly of a cylindrical bearing for a cylindrical shaft and a bearing support having a cylindrical hole permitting a press fit mounting of said bearing into said hole without requiring resizing of said bearing to accommodate said shaft, said assembly comprising:

an axially extending bearing zone in which said cylindrical bearing has an inner bore of diameter to provide a bearing surface for said shaft and an outer diameter of said bearing less than the diameter of said hole to provide an annular space between said bearing and said bearing support to prevent contact between said bearing support and said bearing within said bearing zone, an axially extending support zone axially spaced from said bearing zone in which said cylindrical bearing has an inner bore of diameter greater than said diameter of said inner bore in said bearing zone and an outer diameter providing a press fit with said hole in said bearing support, and an axially extending transition zone between and connecting said bearing zone and said support zone in which said bearing has an inner bore of diameter greater than said diameter of said inner bore in said bearing zone and said outer diameter of said bearing is less than the diameter of said hole to provide an annular space between said bearing and said bearing support whereby deformation of said bearing produced by said press fit between said bearing and said bearing support in said support zone is absorbed by said transition zone in avoidance of deformation of said inner bore of said bearing in said bearing zone.

2. An improved assembly of a cylindrical bearing, bearing support and cylindrical shaft comprising:

a bearing support means having a hole therethrough with a counter bore portion extending from one side of said bearing support means into said bearing support means to produce a shoulder within said hole, and a cylindrical bearing means having an outside diameter to provide a press fit between said cylindrical bearing means and said hole in said bearing support means, said cylindrical bearing means having an axial hole therethrough and a counter bore portion extending into said cylindrical bearing means from the other side of said bearing support means, and extending beyond said shoulder produced by said counter bore in said hole in said bearing support means to provide a region in which said counter bore in said bearing support means and said counter bore in said cylindrical bearing means overlap.

3. An improved assembly of a cylindrical bearing for a cylindrical shaft and a bearing support having a cylindrical hole permitting a press fit mounting of said bearing into said hole without requiring resizing of said bearing to accommodate said shaft, said assembly comprising:

an axially extending bearing zone in which said cylindrical bearing has an inner bore of diameter to provide a bearing surface for said shaft and an outer diameter of said bearing less than the diameter of said hole to provide an annular space between said bearing and said bearing support bounded at its inner periphery by said bearing and at its outer periphery by said bearing support in avoidance of contact between said bearing support and said bearing within said bearing zone, an axially extending support zone axially spaced from said bearing zone in which said support zone said cylindrical bearing has an inner bore of diameter greater than said diameter of said inner bore in said bearing zone and an outer diameter providing a press fit with said hole in said bearing support, an axially extending transition zone between and connecting said bearing zone and said support zone in which transition zone said bearing has an inner bore of diameter greater than said diameter of said inner bore in said bearing zone and said outer diameter of said bearing is less than the diameter of said hole to provide an annular space between said bearing and said bearing support, and cement inserted in and filling said annular spaces.

4. An improved sleeve bearing for a shaft with said bearing capable of being mechanically supported by a press fit into a hole in a bearing support means comprising:

an axially extending supporting zone having an axially aligned inner bore of diameter larger than said shaft and an outer diameter to provide a press fit with said hole in said support means to mechanically hold said bearing and distort said supporting zone without said bearing interfering with said shaft, an axially extending bearing zone separated from said supporting zone having an axially aligned inner bore for providing a cylindrical bearing surface for said shaft and a reduced outer diameter to avoid contact with said hole in said support means and thereby prevent mechanical distortion of said cylindrical bearing surface, and an axially extending transition zone between and connecting said bearing zone and said supporting zone, said transition zone having an axially aligned inner bore of larger diameter than and axially aligned with said bore in said bearing zone and an outer diameter less than the outer diameter of said supporting zone to prevent said bearing support means from distorting said transition zone and to provide a stress relief to prevent physical distortions in said supporting zone from being transmitted to said bearing zone.

* * * * *